(No Model.)

R. W. NEWTON.
AUTOMATIC SPRINKLER.

No. 514,163. Patented Feb. 6, 1894.

WITNESSES:
Henry J. Miller
M. F. Bligh.

INVENTOR:
Robert W. Newton,
by Joseph A. Miller & Co.
Attys.

THE NATIONAL LITHOGRAPHING COMPANY,
WASHINGTON, D. C.

UNITED STATES PATENT OFFICE.

ROBERT W. NEWTON, OF PROVIDENCE, RHODE ISLAND.

AUTOMATIC SPRINKLER.

SPECIFICATION forming part of Letters Patent No. 514,163, dated February 6, 1894.

Application filed May 4, 1893. Serial No. 472,993. (No model.)

*To all whom it may concern:*

Be it known that I, ROBERT W. NEWTON, of Providence, in the county of Providence and State of Rhode Island, have invented certain new and useful Improvements in Automatic Sprinklers; and I hereby declare that the following is a full, clear, and exact description of the same, reference being had to the accompanying drawings, forming part of this specification.

This invention relates particularly to improvements in devices for supporting the valves of automatic-sprinklers under normal conditions, being an improvement on the device shown and described in the patent issued to me July 12, 1892, No. 478,809, to which reference is made.

One object of the invention is to provide the thrust-arm, of a valve-supporting device, with a securing-plate so constructed that the one will exert a leverage on the other.

Another object of the invention is to provide a valve-supporting device furnished with spring thrust-arms.

Still another object of the invention is to construct a thrust-support for the valves of automatic sprinklers which will be of great strength without reducing the sensitiveness of the same to the action of heat.

The invention consists in the construction of the thrust-arms and their combination with a suitable support to form a thrust-block.

Figure 1:
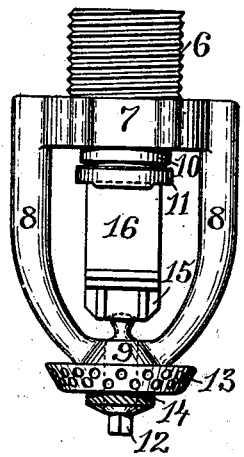
Figure 2:
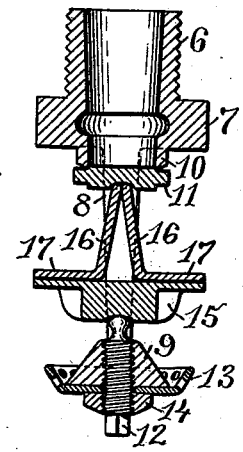
Figure 3:
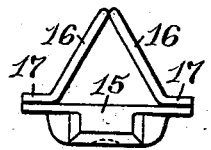
Figure 4:
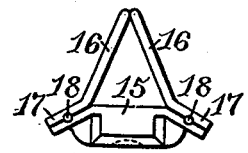
Figure 5:
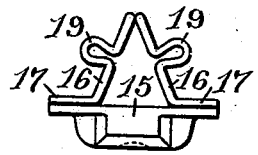
Figure 6:
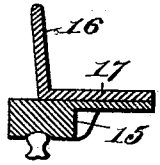

Figure 1 represents a side view of an automatic-sprinkler showing one form of the new valve-support. Fig. 2 represents a vertical sectional view of the same. Fig. 3 represents a view of the thrust-block removed from the sprinkler, the thrust-arms being inclined at a greater angle than those illustrated in Fig. 2. Fig. 4 is a similar view illustrating a modified form of the thrust-block. Fig. 5 represents a similar view showing the inwardly-inclined thrust-arms bent to form springs. Fig. 6 represents a side view of the improved thrust-block in which but one thrust-arm and its securing-plate are used, also indicating the bearing of the lateral support on the adjustable screw.

Similar numbers of reference designate corresponding parts throughout.

In the drawings 6 indicates the screw-threaded tubular shank of an automatic-sprinkler.

7 is the yoke, and 8—8 are the arms of the frame, which extend from the yoke, curving inward to the perforated-hub 9,—from the inner surface of the yoke extends the valve-seat 10, and a valve 11 is provided for closing the valve-seat. The perforation of the hub 9 is screw-threaded and in this perforation is engaged the adjustable-screw 12, for adjusting the pressure on the thrust block, carrying the deflector 13 and the lock-nut 14, the upper end of the screw being shaped to engage the lower portion of the thrust-support.

The valve-support consists of a base 15, or a similar device, adapted to engage the upper end of the adjusting-screw and to support one or more of the thrust-arms 16—16; these thrust-arms are secured to the base 15 by the securing ends, or plates, 17—17 formed in part with the thrust-arms, from which the thrust-arms are more or less inclined, as is shown in several figures. Where the thrust-arm 16 is bent at or nearly at right angles with the plate 17 only one of the arms need be used thus greatly increasing the sensitiveness of the sprinkler to the action of heat, in this case the base of the thrust-arm would rest on the base 15, or other support, nearly in a line with the adjusting-screw 12, only one-half of this support 15 need then be used and its length on that side as also the length of the plate 17 may be increased. The plates 17 are secured to the support 15 by means of solder, fusible at a low temperature, and pins 18—18, or their equivalents, may be let into concavities of the adjoining surfaces, when necessary, to reduce the strain on the solder.

When it is desired to secure a spring between the solder-joint and the valve to avoid the damage thereto caused by water-pound, or other intermittent strain, the thrust-arms are bent outward and inward to form spring-loops 19—19, shown in Fig. 5, and the arms hardened to increase their resiliency.

In practice it is found that when exposed to heat one of the arms 16 will be released before the other, but it is sometimes preferable, when the arms are nearly in line with the adjusting-screw, to use but one. By this construction I gain a leverage on the thrust-arm from the securing-plate and the point of first separation of the plate 17 from its support is at the outer end, whereas when the thrust-arm and plate are separate the plates are pushed off of the base and are obliged to move a distance equal to the length of the plate before the danger of sticking is overcome.

Having thus described my invention, I claim as new and desire to secure by Letters Patent—

1. In an automatic-sprinkler, a valve-supporting device, consisting of an inclined valve-supporting thrust-arm having a laterally-extending leverage securing-plate extending at an angle from the arm, a laterally-extending support to which the plate is soldered, and an adjustable screw adapted to engage the support.

2. In a valve-supporting device, for automatic sprinklers, thrust-arms having loops bent therein and securing-plates integral therewith, in combination with a transverse block to which the securing arms are soldered.

In witness whereof I have hereunto set my hand.

ROBERT W. NEWTON.

Witnesses:
M. F. BLIGH,
J. A. MILLER, Jr.